Oct. 28, 1930.  R. L. TULLIS  1,779,864
BIRD CAGE
Filed April 26, 1927

Inventor
Ross L. Tullis

By Rockwell & Bartholow
Attorneys

Patented Oct. 28, 1930

1,779,864

UNITED STATES PATENT OFFICE

ROSS L. TULLIS, OF NEW HAVEN, CONNECTICUT, ASSIGNOR TO THE ANDREW B. HENDRYX COMPANY, OF NEW HAVEN, CONNECTICUT

BIRD CAGE

Application filed April 26, 1927. Serial No. 186,685.

This invention relates to bird cages, and the embodiment which I have selected to illustrate and describe is a cage made up of cellulose esters material, such as pyralin. Cages made of this material have many advantages, for example, the possibility of constructing them in a great variety of colors and combinations of colors, the high luster which may be given them so as to add to their ornamental and attractive appearance, and the fact that they may be readily cleansed and kept in a clean, sanitary condition. Moreover, the nature of this material is such that the cross members of the cage may be very easily joined together by the use of a solvent which causes the material to flow together and unite so as to form a substantially one-piece structure. The invention is not limited, however, to the use of this material.

One object of the invention is to provide a bird cage structure of sanitary character, attractive in appearance, and convenient to use.

Another object of my invention is to provide a new form of rail for a cage of this type.

Still another object of this invention is to provide a novel form of rail and joint therefor.

To these and other ends, the invention consists in the novel features and combinations of parts to be hereinafter described and claimed.

Figure 1:
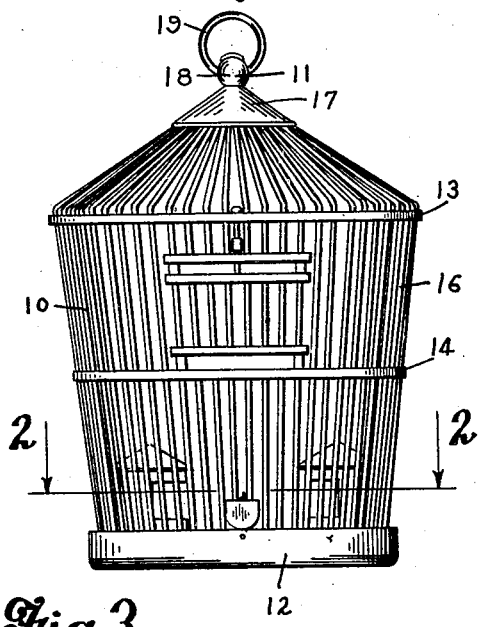
Fig. 1 is an elevational view of a bird cage embodying the features of my invention.
Figure 2:
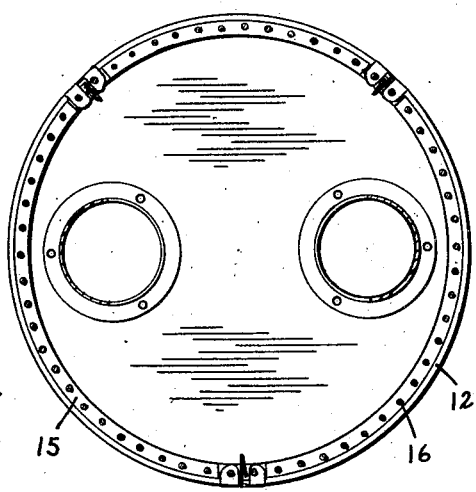
Fig. 2 is a section on line 2—2 of Fig. 1.

The bird cage selected to illustrate the features of this invention, generally comprises a body portion 10, a supporting means 11, and a bottom portion 12. The body portion 10 consists in integrally united horizontal rails 13, 14 and 15 and vertical wire-like rods 16. The rails 13, 14 and 15 are arranged so that rail 15 is at the bottom of the structure, rail 13 is adjacent the upper portion of the body 10, and rail 14 is disposed intermediate rails 13 and 15. The rods 16 above rail 13 are bent inwardly and converge into a cone shape, being secured beneath a cone-shaped cap 17, with which is associated a ball 18 and a cage supporting ring 19.

The rails 13, 14 and 15 of Figs. 1 to 5 inclusive, are formed of strip stock, a cross section of which is in the form of a right angle. This stock may be obtained in this shape or may be formed from flat stock by turning an edge of a flat strip at right angles to the remainder.

The stock is furnished in long lengths and is cut up into the desired lengths to form a rail. These shorter lengths are bent about into the form of the cage and are of sufficient length to encircle the periphery thereof. One portion 20 of these shorter lengths is disposed in substantially a horizontal plane, with a remaining portion 21 extending about the outer periphery thereof and at right angles thereto. When applied to a cage, the portion 21 is preferably disposed in a depending position relatively to the portion 20, which latter forms a flat top surface for the rail.

Figures 3, 4, 5:
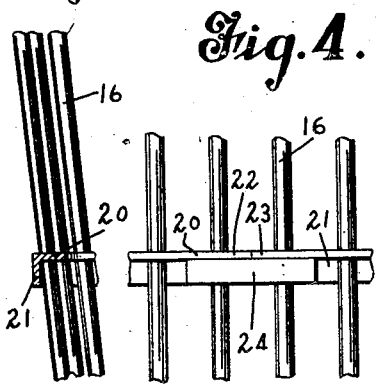
Fig. 3 is an enlarged vertical section of a portion of the cage, taken through one of the rails thereof.
Fig. 4 is an inside elevation showing the novel rail joint.
Fig. 5 is an inside elevation showing another form of rail joint.

The ends 22 and 23 of the short lengths of stock may be either abutted, as shown at Fig. 4, or overlapped, as shown in Fig. 5. When abutted, a piece of the same material, 24, substantially square in cross section, is disposed between the ends 22 and 21 and overlaps the ends 22 and 23 of the short length. A solvent for the material used is applied to the adjacent surfaces of these parts. Before the solvent evaporates, the parts flow together and afterwards harden to form an integral structure thereof. When the ends 22 and 23 are overlapped, solvent is applied to the contiguous portions causing them to integrally unite.

The rail so formed is then heated or pressed or otherwise formed into the desired shape corresponding to the cage periphery. Perforations are then provided in the horizontally disposed portion 20. Perforations are preferably located transversely of the rail portion 20 so that the wire-like rods 16 will contact with the rail portion 21 when they are inserted therethrough.

After the assembly of the rods 16 to the rails, a solvent for the material used is applied to the contiguous portions thereof, which softens the material whereby it flows together and unites. When the solvent has evaporated the material hardens and the rails and rods are integrally united into a one-piece structure with the rail portion 20 united to the rods at the perforations, and the rail portion 21 united to the rods at the portions in contact therewith. A rigid and sturdy structure is thus formed, which is inexpensive to manufacture and of decorative appearance.

Figures 6, 7:
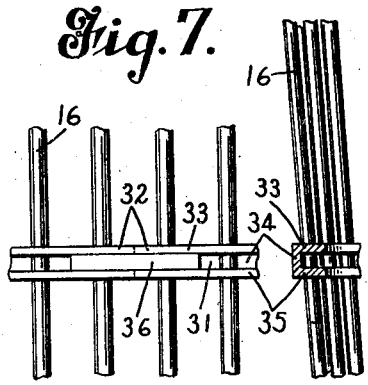
Fig. 6 is an enlarged section through a rail of somewhat different form.
Fig. 7 is an inside view showing the form of rail joint used with the rail shown in Fig. 6.

A rail, channel shaped in cross section, is shown in Figs. 6 and 7, the open or channel side 31 preferably being directed toward the cage interior. The strip ends 32 are abutted and integrally united together by the application of a solvent for the material used.

The channel shaped rail 31 includes in its structure, a horizontally disposed portion 33, and a portion 34 disposed at substantially right angles to the portion 33 and about the outer periphery thereof. Another portion 35 parallel to the portion 33 and directed inwardly from an edge of the portion 34, completes the channel form illustrated.

A part 36, preferably a piece of the same material, is inserted between the portions 33, 34 and 35, and extends across the abutted ends 32 to overlap the end portions at each side of the joint and reinforce the rail at this point. The part 36 is integrally united to the adjacent rail portions by the application of a solvent, to the contiguous portions thereof.

By securing the rods or wireform elements in perforations in one flange of the rail by interflowing the material by the use of a solvent or otherwise, and causing, similarly, the interflowing of the material between the sides of the wireform elements and those portions of another flange of the rail which lie substantially parallel and in contact therewith, the connection between the rail and the rods is made very secure, and the angular rail firmly supports the rods and gives very substantial reinforcement to the structure in the zone where the rail is applied.

While I have shown and described preferred embodiments of my invention, it will be understood that the same is not to be limited to the details shown, but is capable of modification and variation which will lie within the spirit of the invention and the scope of the appended claims.

What I claim is:

1. In a bird cage, a body comprising a plurality of substantially vertically arranged wireform elements of cellulose ester, and a substantially horizontal rail of the same material surrounding said elements and securing them rigidly together in spaced relation, said rail comprising a single strip U-shaped in cross section bent to the form of the cage with the space between the legs of the U opening inwardly towards the cage center, the free ends of the strip being joined by direct adhesion, and a block of cellulose ester received wholly between the legs of the U and overlapping the ends of the strip, said block being joined to the strip by direct adhesion.

2. In a bird cage, a body comprising a plurality of substantially vertically arranged wireform elements of a cellulose ester material and a substantially horizontal rail of the same material surrounding said elements and securing them rigidly together in spaced relation, said rail comprising a single strip of said material having flanges in approximately right-angular relation bent to the form of the cage with one of the flanges extending horizontally and the other extending downwardly from the periphery of the strip, the angle between the flanges opening inwardly towards the center of the cage, the free ends of said strip being joined by direct adhesion and a block of cellulose ester fitting into the angle between and wholly received within the outlines of the arms of the strip, said block overlapping the ends of the strip and being joined to the strip by direct adhesion.

In witness whereof, I have hereunto set my hand this 23rd day of April, 1927.

ROSS L. TULLIS.